(No Model.)

R. MASON.
CHECKREIN HOOK.

No. 384,859. Patented June 19, 1888.

WITNESSES INVENTOR

UNITED STATES PATENT OFFICE.

ROBERT MASON, OF EXETER, NEW HAMPSHIRE.

CHECKREIN-HOOK.

SPECIFICATION forming part of Letters Patent No. 384,859, dated June 19, 1888.

Application filed April 21, 1888. Serial No. 271,448. (No model.)

*To all whom it may concern:*

Be it known that I, ROBERT MASON, a citizen of the United States, residing at Exeter, in the county of Rockingham and State of New Hampshire, have invented an Improvement in Checkrein-Hooks, of which the following is a full, clear, and exact description, reference being had to the accompanying drawings, making part of this specification, in which—

Figure 1:
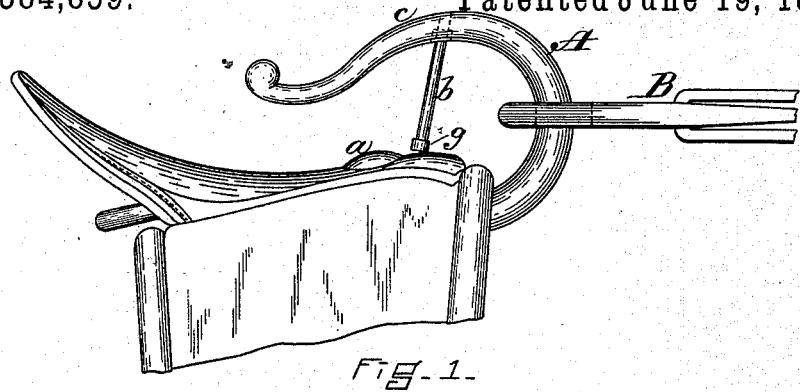
Figure 2:
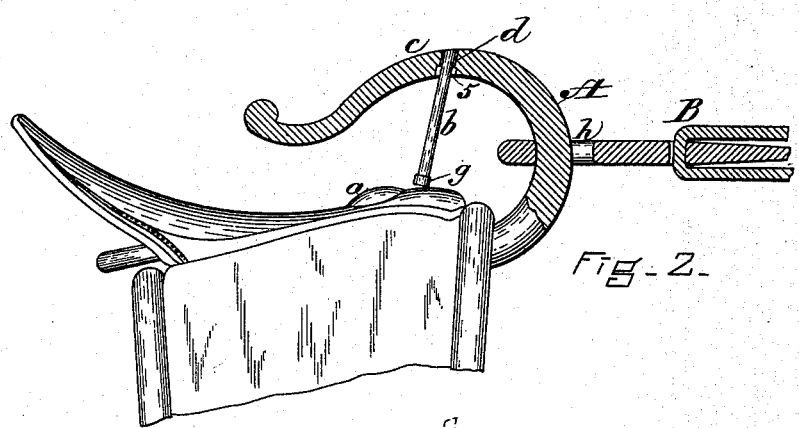
Figure 3:
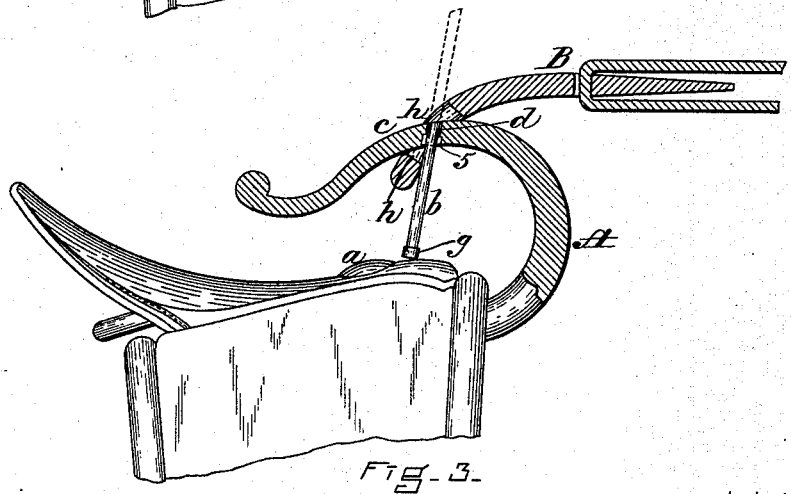

Figure 1 is a side elevation of my improved checkrein-hook having an "overdraw" checkrein applied thereto. Fig. 2 is a longitudinal vertical section of the same. Fig. 3 is a similar section illustrating the manner in which the checkrein is passed over the hook.

The ordinary checkrein-hook in most common use is objectionable, for the reason that it fails to securely hold the checkrein in place, and the latter frequently becomes detached or unhooked by the motion of the horse in driving, which is a great inconvenience. To remedy this difficulty is the object of my invention, which consists in a checkrein-hook having its upper portion provided with a pin or bolt which slides freely up and down through an aperture therein, and serves when down to inclose the rein within the hook and effectually prevent its escape therefrom, the sliding pin having a stop or enlargement at its lower end, whereby it is prevented from becoming detached from the hook in handling the harness, or when being raised to admit or release the checkrein.

In the said drawings, A represents a checkrein-hook which is secured to the saddle in the usual manner by means of a screw-bolt, *a*. In the upper portion, *c*, of the hook A, preferably at or about the middle of its length, is formed an aperture, *d*, in which is fitted to slide freely up and down therein a pin or bolt, *b*, at the lower end of which is formed an enlargement, *g*, which serves as a stop to prevent the pin from falling out of the aperture *d* in handling the harness, or when being raised by the fingers to permit the entrance or exit of the checkrein B. The checkrein here shown is of the description known as an "overdraw" checkrein, now almost universally used for light driving-harness, said rein consisting of a single strap having loosely attached to its inner end a short flat piece of leather provided with a small aperture, *h*, to enable it to be passed over the point of the hook. The aperture *d* in the upper portion of the hook A is preferably countersunk at its lower end at 5 to receive the enlargement *g*, which, when the pin *b* is raised to its full extent, is thus caused to lie flush with the under side of the upper portion of the hook, thus offering no obstruction to the passage of the rein at this point. The length of the pin *b* is such that when down in the position seen in Figs. 1 and 2 its upper end will not project above the upper surface of the portion *c* of the hook, the pin when in this position effectually preventing the checkrein from becoming accidentally unhooked by the motion of the horse in driving.

In the operation of applying an overdraw checkrein to the hook, the pin *b* being down, the end of the checkrein B having the aperture *h* is first passed over the point of the hook until it is stopped by the lower portion of the pin, and is then bent over into the position seen in Fig. 3, which inclination carries the upper end of the aperture *h* beyond the upper end of the pin *b*, the lower portion of which stops the further passage of the rein over the hook. The pin *b* is then raised by taking hold of the lower portion and afterward of the upper portion with the finger and thumb until the stop or enlargement *g* at its lower end lies within the countersink 5, when the end of the rein is free to pass entirely over the hook into its proper place, after which the pin *b* is released and drops by its own gravity into the position seen in Figs. 1 and 2, thus inclosing the rein and effectually preventing its accidental escape from the hook. In removing the rein from the hook the operation is reversed, the pin *b* being first raised and the lower end of the checkrein drawn back until the lower end of the aperture *h* is brought into a position behind the lower end, *g*, of the pin, after which the pin is pushed or allowed to drop down to its full extent, which brings its upper end flush with the upper surface of the portion *c* of the hook, when the rein will be free to be disengaged from the hook, as desired.

It is obvious that it would be impossible for an overdraw checkrein to become accidentally unhooked in driving, even if the pin *b* were raised by the motion of the horse; but to avoid any possibility of an ordinary side check-rein when used with my improved hook becoming disengaged therefrom, I prefer to incline the pin $b$ at a slight angle from the vertical, as shown, which removes any liability of its being accidentally thrown up by the motion of the horse in driving.

The above-described device is extremely simple, inexpensive, and free from liability to get out of order, and it is evident that it can be easily applied at a trifling expense to check-rein-hooks already in use, and that it can be used either with an overdraw or side check-rein, as desired.

What I claim as my invention, and desire to secure by Letters Patent, is—

The combination, with the hook A, of the pin $b$, sliding freely up and down through an aperture, $d$, in the upper portion of said hook and inclined at an angle, as described, and having a stop or enlargement, $g$, at its lower end, adapted when said pin is raised to lie within a countersink, 5, at the bottom of the aperture $d$, substantially as and for the purpose set forth.

Witness my hand this 16th day of April, A. D. 1888.

ROBERT MASON.

In presence of—
ALBERT S. WETHERELL,
ALBERT J. WEEKS.